US010965582B2

(12) United States Patent
Yadlapalli et al.

(10) Patent No.: US 10,965,582 B2
(45) Date of Patent: *Mar. 30, 2021

(54) METHODS AND APPARATUS TO REFLECT ROUTES FROM A REMOTELY LOCATED VIRTUAL ROUTE REFLECTOR

(71) Applicant: AT&T Intellectual Property I, L.P., Atlanta, GA (US)

(72) Inventors: Chaitanya Yadlapalli, Colts Neck, NJ (US); James Uttaro, Staten Island, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/058,720

(22) Filed: Aug. 8, 2018

(65) Prior Publication Data

US 2018/0351847 A1  Dec. 6, 2018

Related U.S. Application Data

(63) Continuation of application No. 14/812,426, filed on Jul. 29, 2015, now Pat. No. 10,069,716.

(51) Int. Cl.
*H04L 12/751* (2013.01)
*H04L 12/715* (2013.01)
(Continued)

(52) U.S. Cl.
CPC .............. *H04L 45/02* (2013.01); *H04L 45/04* (2013.01); *H04L 45/12* (2013.01); *H04L 45/52* (2013.01); *H04L 45/586* (2013.01); *H04L 45/60* (2013.01)

(58) Field of Classification Search
CPC ......... H04L 45/02; H04L 45/60; H04L 41/12; G06F 9/5061; G06F 15/16; G06F 2221/2129
(Continued)

(56) References Cited

U.S. PATENT DOCUMENTS 5,926,101 A    7/1999  Dasgupta
6,272,548 B1   8/2001  Cotter et al.
(Continued)

FOREIGN PATENT DOCUMENTS

EP    2036277      3/2009
JP    2002319962   10/2002
(Continued)

OTHER PUBLICATIONS

Feamster et al., "Guidelines for interdomain traffic engineering," ACM SIGCOMM Computer Communication Review 33.5, 2003, (12 pages).
(Continued)

*Primary Examiner* — Tesfay Yohannes
(74) *Attorney, Agent, or Firm* — Amin, Turocy & Watson, LLP

(57) ABSTRACT

Methods, apparatus, systems and articles of manufacture to reflect routes from a virtual route reflector are disclosed. An example method includes requesting, at a virtual route reflector remote from an autonomous system, topology information and external route information from the autonomous system. The external route information identifies a plurality of border routers through which a remote destination can be reached. The example method also includes selecting, using the topology information, a first path from among a plurality of paths emanating from a selected node in the autonomous system, the plurality of paths exiting the autonomous system at respective border routers of the plurality of border routers. The example method further includes advertising, from the virtual route reflector to a client router in the autonomous system, a route to the remote destination, the route including a first border router at which the first path exits the autonomous system.

20 Claims, 8 Drawing Sheets

(51) Int. Cl.
*H04L 12/721* (2013.01)
*H04L 12/781* (2013.01)
*H04L 12/713* (2013.01)
*H04L 12/773* (2013.01)

(58) Field of Classification Search
USPC .............................. 709/224, 238; 370/220
See application file for complete search history.

(56) References Cited

U.S. PATENT DOCUMENTS

| | | | |
|---|---|---|---|
| 7,801,048 B1 * | 9/2010 | Sivabalan | H04L 45/12 370/238 |
| 7,856,509 B1 | 12/2010 | Kodeboyina | |
| 7,873,993 B2 | 1/2011 | King | |
| 7,876,672 B2 | 1/2011 | Chao et al. | |
| 7,945,658 B1 | 5/2011 | Nucci et al. | |
| 8,121,618 B2 * | 2/2012 | Rhoads | G06F 3/011 455/456.1 |
| 8,141,156 B1 | 3/2012 | Mao et al. | |
| 8,166,195 B2 | 4/2012 | Van Der Merwe et al. | |
| 8,179,905 B1 | 5/2012 | Napierala et al. | |
| 8,194,535 B2 | 6/2012 | Kodialam et al. | |
| 8,264,955 B2 | 9/2012 | Chao et al. | |
| 8,265,616 B2 | 9/2012 | Turk | |
| 8,320,361 B2 | 11/2012 | Mohapatra et al. | |
| 8,509,078 B2 | 8/2013 | Moscibroda et al. | |
| 8,537,840 B1 | 9/2013 | Raszuk et al. | |
| 8,559,414 B2 | 10/2013 | Yilmaz et al. | |
| 8,779,390 B2 * | 7/2014 | Connally | G02B 21/16 250/459.1 |
| 8,792,508 B2 | 7/2014 | Ihle et al. | |
| 9,055,000 B1 | 6/2015 | Ghosh et al. | |
| 9,178,801 B1 | 11/2015 | Guichard et al. | |
| 9,485,135 B1 * | 11/2016 | Sarkar | H04L 45/22 |
| 2001/0032272 A1 | 10/2001 | Fujita | |
| 2002/0024934 A1 * | 2/2002 | Galand | H04L 45/04 370/238 |
| 2003/0206521 A1 | 11/2003 | Qiao | |
| 2004/0081154 A1 | 4/2004 | Kouvelas | |
| 2006/0083215 A1 | 4/2006 | Uttaro | |
| 2006/0291446 A1 | 12/2006 | Caldwell et al. | |
| 2007/0097974 A1 | 5/2007 | Ward et al. | |
| 2007/0104197 A1 | 5/2007 | King | |
| 2009/0292948 A1 * | 11/2009 | Cinato | H04L 43/00 714/26 |
| 2010/0220736 A1 | 9/2010 | Mohapatra et al. | |
| 2010/0235915 A1 * | 9/2010 | Memon | H04L 63/145 726/23 |
| 2012/0213218 A1 | 8/2012 | Yilmaz et al. | |
| 2013/0031271 A1 | 1/2013 | Bosch et al. | |
| 2013/0107698 A1 | 5/2013 | Bejerano et al. | |
| 2013/0201909 A1 | 8/2013 | Bosch et al. | |
| 2014/0003227 A1 | 1/2014 | Scudder et al. | |
| 2015/0350062 A1 * | 12/2015 | Lindem, III | H04L 45/18 370/220 |
| 2017/0034039 A1 * | 2/2017 | Yadlapalli | H04L 45/02 |

FOREIGN PATENT DOCUMENTS

| | | |
|---|---|---|
| JP | 2002354012 | 12/2002 |
| JP | 2003218917 | 7/2003 |
| JP | 2004048330 | 2/2004 |
| WO | 2007047867 | 4/2007 |

OTHER PUBLICATIONS

Gredler et al., "North-Bound Distribution of Link-State and TE Information Using BGP," Internet Draft, Internet Engineering Task Force, draft-ietf-idr-ls-distribution-10, Jan. 26, 2015, (39 pages).

Hu et al., "Wide-Area IP Network Mobility," INFOCOM 2008. The 27th Conference on Computer Communications. IEEE. IEEE, 2008, pp. 1624-1632.

International Searching Authority, "International Search Report and Written Opinion," issued in connection with International Patent Application No. PCT/US2016/044073, dated Nov. 8, 2016 (10 pages).

International Searching Authority, "International Preliminary Report on Patentability," issued in connection with International Application No. PCT/US2016/044073, 6 pages.

Lent, "On the Design and Performance of Cognitive Packets Over Wired Networks and Mobile Ad Hoc Networks," Dissertation, University of Central Florida Orlando, Florida, 2003, (177 pages).

Mauricio G. C. Resende, "An Optimizer in the Telecommunications Industry," SIAG/OPT Views-and-News, vol. 18, No. 2, Oct. 2007, pp. 8-19.

Mohapatra et al., "The Accumulated IGP Metric Attribute for BGP," Request for Comment No. 7311, Internet Engineering Task Force, Aug. 2014, (17 pages).

Raszuk, et al., BGP Optimal Route Reflection (BGP-ORR), Request for Comment 4456, Internet Engineering Task Force, draft-ietf-idr-bgp-optimal-route-reflection-05, Jun. 4, 2013, (44 pages).

Zhang et al., "Collecting the Internet AS-level Topology," ACM SIGCOMM Computer Communication Review, Jan. 1, 2005 (9 pages).

United States Patent and Trademark Office, "Non-Final Office Action," issued in connection with U.S. Appl. No. 14/812,426, dated Apr. 3, 2017, 13 pages.

United States Patent and Trademark Office, "Final Office Action," issued in connection with U.S. Appl. No. 14/812,426, dated Nov. 8, 2017, 15 pages.

United States Patent and Trademark Office, "Notice of Allowance," issued in connection with U.S. Appl. No. 14/812,426, dated May 4, 2018, 11 pages.

* cited by examiner

METHODS AND APPARATUS TO REFLECT ROUTES FROM A REMOTELY LOCATED VIRTUAL ROUTE REFLECTOR

RELATED APPLICATION(S)

This patent arises from a continuation of U.S. patent application Ser. No. 14/812,426 (now U.S. Pat. No. 10,069, 716[H]) which is entitled "METHODS AND APPARATUS TO REFLECT ROUTES FROM A REMOTELY LOCATED VIRTUAL ROUTE REFLECTOR," and which was filed on Jul. 29, 2015. Also, priority is claimed to U.S. patent application Ser. No. 14/812,426, and U.S. patent application Ser. No. 14/812,426 is hereby incorporated by reference in its entirety.

FIELD OF THE DISCLOSURE

This disclosure relates generally to route reflectors, and, more particularly, to methods and apparatus to reflect routes from a remotely located virtual route reflector.

BACKGROUND

"Hot potato" routing is a term used to describe a method by which a route reflector in an autonomous system can select a routing path from among multiple routing paths to a remote destination. The method aims to reduce traffic inside of the autonomous system by transmitting out-bound traffic as quickly as possible. When the route reflector learns that a remote destination can be reached via either a first edge router representing a first point of egress or a second edge router representing a second point of egress, the route reflector selects one of the first or the second edge routers and then notifies a set of client routers that the remote destination can be reached via the selected edge router. Employing hot potato routing, the route reflector selects, and advertises to the client routers, the nearest of the first and second edge routers thereby selecting the nearest point of egress of the autonomous system. As a result of selecting the nearest point of egress, the client routers cause communications intended for the remote destination to exit the autonomous system as quickly as possible.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
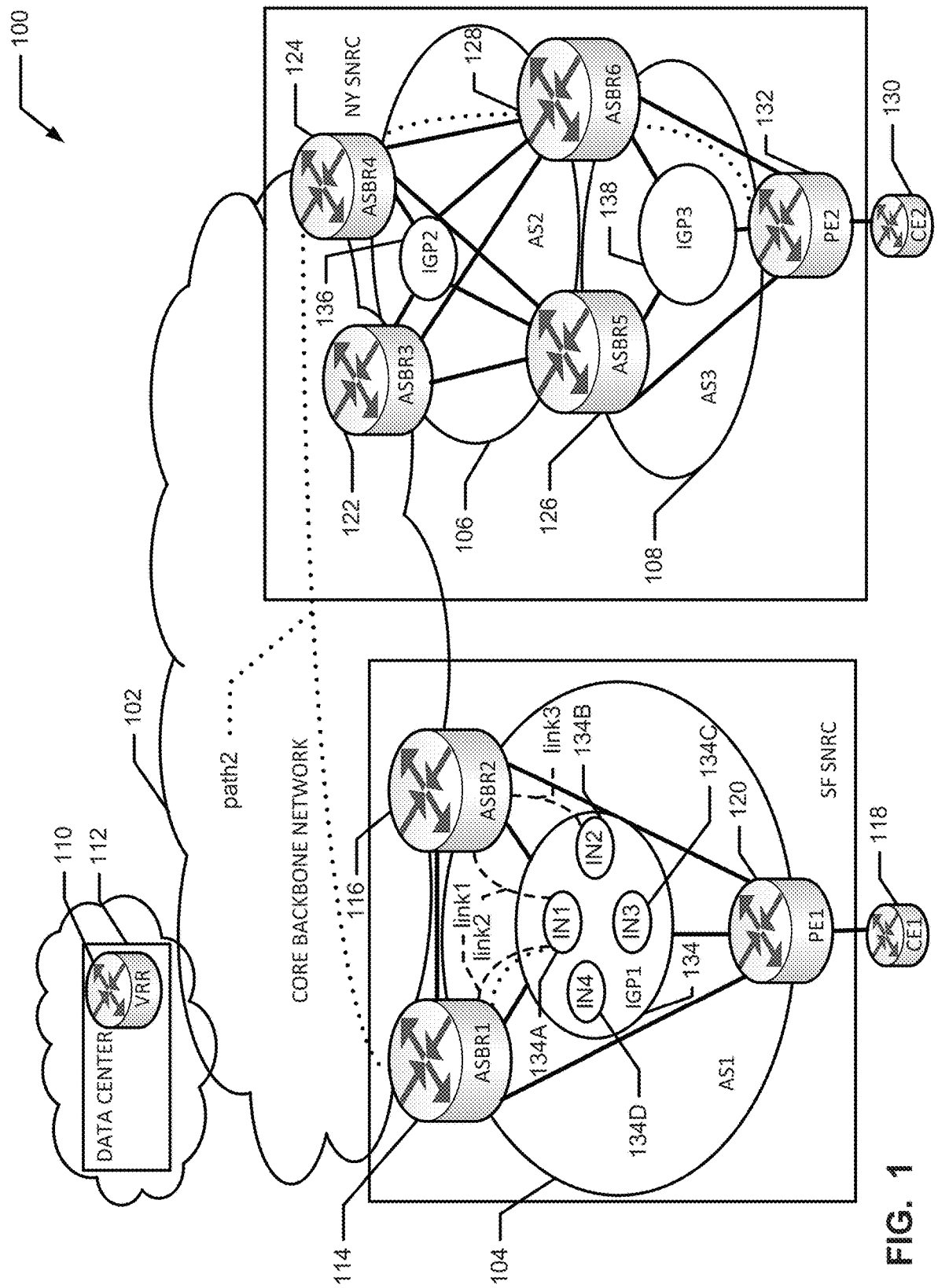
FIG. 1 is a schematic diagram of an example communication system network having a core backbone network, example first, second and third autonomous system networks and an example virtual route reflector residing in a data center.

The methods, apparatus and systems disclosed herein provide ways to perform hot potato routing that permits a route reflector to be placed anywhere relative to, and even distant from, a set of client routers served by the route reflector without affecting the efficiency of routing path selection.

Some example methods to virtually reflect routes disclosed herein include requesting, at a route reflector remote from an autonomous system, topology information and external route information from the autonomous system. The external route information identifies a plurality of border routers through which a remote destination can be reached. Example methods also include selecting, using the topology information at the route reflector, a first path from among a plurality of paths emanating from a selected node in the autonomous system. The plurality of paths exit the autonomous system at respective border routers of the plurality of border routers. Some example methods further include advertising, from the route reflector to a client router in the autonomous system, a route to the remote destination. The advertised route includes a first border router at which the first path exits the autonomous system.

In some examples, the first border router is determined to be a nearest point of egress from the autonomous system relative to the selected node. In some examples the topology information is first topology information, the autonomous system is a first autonomous system and the method also includes requesting, at the route reflector, second topology information from a second autonomous system. In some such examples, the first path is determined based on the first topology and the second topology and the remote destination is located in the second autonomous system.

In some further examples, the first topology information is associated with a first interior gateway protocol, the second topology is associated with a second interior gateway protocol, and the first and second interior gateway protocols are different protocols.

In some examples, the first topology information is associated with an interior gateway protocol and requesting the topology information includes initiating a border gateway protocol session with a second border router located on a border of the first autonomous system.

In some examples, selecting a first path includes virtually positioning the route reflector at a location associated with the selected node and determining a cost associated with each of the plurality of paths emanating from the selected node. In some such examples, the first path has the lowest cost.

In some examples, the client router is a first client router, the route is a first route, the selected node is a first node, and the location is a first location. In some such examples, the method further includes virtually positioning the route reflector at the second location at which the second node is located and determining a cost associated with a plurality of paths emanating from the second node and exiting the autonomous system at respective border routers of the plurality of border routers. Some such examples can further include selecting a second path based on the cost determined for the second path and advertising, from the route reflector to a second client router in the autonomous system, a second route to the remote destination. The second route includes a second border router at which the second path exits the autonomous system.

Hot potato routing is a generally effective routing technique when the router reflector is located near its clients. However, the technique can become less effective as the distance between the route reflector and the route reflector's clients increases. For example, a route reflector may determine that between a first edge router and a second edge router that are both able to reach a same remote destination, the first edge router is nearer to itself than the second edge router. As a result, the route reflector advertises the first edge router to the clients of the route reflector. Yet one or more of the route reflector's clients may actually be nearer to the second edge router. When this occurs, some communications to the remote destination will not exit the autonomous system at a nearest point of egress thereby causing the autonomous system to support more traffic than necessary. As a result, network designers looking to utilize hot potato routing attempt to place each route reflector within a desired distance of its clients. For example, each point of presence in an autonomous system having multiple points of presence, is typically equipped with a route reflector. Additionally, large autonomous systems typically have multiple route reflectors strategically placed at various geographical locations in the autonomous system.

Unfortunately, commercially available route reflectors are typically expensive. Thus, it would be desirable to limit the number of route reflectors, yet still be able to achieve effective hot potato routing. The methods systems and apparatus disclosed herein allow the replacement of existing, physical route reflectors with virtualized route reflectors that can be implemented as software installed on any hardware platform capable of operating as a router. Thus, the need to buy expensive, commercially available route reflectors is eliminated.

Moreover, the virtual route reflectors disclosed herein are programmed to serve clients located within a physically remote autonomous system using topology information obtained from the autonomous system. In some examples, the virtual route reflectors are programmed to obtain the topology information from the remote autonomous system, to select a node within the autonomous system based on the topology information, and to operate as though the virtual route reflector were located at the selected node when making routing selections. As a result, the virtual route reflector operates as though it were located within the autonomous system. In some examples, a virtual route reflector disclosed herein causes topology information from a first autonomous system that uses a first interior gateway protocol (IGP) to send first topology information converted into an exterior border gateway protocol (e.g., BGP) and further causes a second autonomous system (contiguous with the first autonomous system) that uses a second IGP to send second topology information converted into BGP, and then uses an accumulated metric associated with the first and second topologies to make best path selections for communications between the first and the second autonomous systems.

FIG. 1 is a schematic diagram illustrating a communication system 100 having a core backbone network (the "core") 102 coupled to an example first autonomous system ("AS1") 104, an example second autonomous system, ("AS2") 106, an example third autonomous system ("AS3") 108 and an example virtual route reflector ("VRR") 110 residing in an example data center 112. In some examples, the AS1 104 is coupled to the core 102 via an example first autonomous system boundary router ("ASBR1") 114, and an example second autonomous boundary router ("ASBR2") 116 and further coupled to an example first customer edge router ("CE1") 118 via an example first provider edge router ("PE1") 120.

In some examples, the AS2 106 is coupled to the core backbone network 102 via an example third autonomous system boundary router ("ASBR3") 122, and an example fourth autonomous boundary router ("ASBR4") 124 and is further coupled to the AS3 108 via an example fifth autonomous system boundary router ("ASBR5") 126, and an example sixth autonomous boundary router ("ASBR6") 128. In some examples, the AS3 108 is further coupled to an example second customer edge router ("CE2") 130 via an example second provider edge router ("PE2") 132.

In some examples, the example AS1 104 includes a set of internal nodes 134 (e.g., an example first internal node ("IN1") 134A, an example second internal node ("IN2") 134B, (e.g., an example third internal node ("IN3") 134C, and an example fourth internal node ("IN4") 134D). In some examples, the internal nodes 134 are fully meshed routers that communicate using an example first interior gateway protocol ("IGP1"). In some examples, the IGP1 is implemented using a protocol referred to as Open Shortest Path First ("OSPF") version 2 or version 3 and/or is implemented using a protocol referred to as Intermediate System to Intermediate System (IS-IS). The lines of FIG. 1 connecting the ASBR1 114, the ASBR2 116 and the PE1 120 are used to indicate that the ASBR1 114, the ASBR2 116 and the PE1 120 are able to communicate, but do not necessarily indicate that the routers are physically coupled. Likewise, the line connecting the ASBR1 114, the ASBR2 116 and the PE1 120 to the internal nodes 134 of the AS1 104 are intended to indicate that the ASBR1 114 and the ASBR2 116 and the PE1 120 are able to communication with the internal nodes 134 of the AS1 104, but do not necessarily indicate that the routes are physically coupled.

In some examples, the example AS2 106 also includes a set of internal nodes 136 (represented collectively using an ellipse in FIG. 1 and represented individually in FIG. 3 as described hereinbelow) that communicate using an example second interior gateway protocol ("IGP2") which may be implemented using, for example, OSPF v2/v3, IS-IS etc. Likewise, the example AS3 108 includes a set of internal nodes 138 (represented collectively via an ellipse in FIG. 1 and individually in FIG. 3 as described hereinbelow) that communicate using a third interior gateway protocol ("IGP3") which may be implemented using, for example, OSPF v2/v3, IS-IS etc.

In some examples, the example autonomous system boundary routers (e.g., the example ASBR1 114, and the example ASBR2 116, the example ASBR3 122, the example ASBR4 124, the example ASBR5 126, and the example ASBR6 128) and the example provider edge routers (e.g., the example PE1 120 and the example PE2 132) use an exterior border gateway protocol ("EBGP") to learn routes to destinations located outside of the respective example autonomous systems (e.g., the example AS1 104, the example AS2 106, the example AS3 108, etc.). Thus, the ASBR1 114, the ASBR2 116, the ASBR3 122, the ASBR4 124, the ASBR5 126, the ASBR6 128, the PE1 120 and the PE2 132 provide a gateway by which routers within the respective autonomous systems (e.g., the example AS1 104, the example AS2 106 and the example AS3 108) can reach exterior destinations (i.e., destinations outside of AS1 104, the AS2 106, and the AS3 108, respectively). Additionally, the border routers (e.g., the ASBR1 114, the ASBR2 116, the ASBR3 122, the ASBR4 124, the ASBR5 126, and the ASBR6 128, the PE1 120 and the PE2 132) use respective interior gateway protocols (e.g., IGP1, IGP2, IGP3) to communicate with internal nodes of the respective autonomous systems (e.g., AS1 104, the AS2 106 and the AS3 108). Thus, for example, the ASBR1 114, the ASBR2 116 and the PE1 120 communicate with the internal nodes (e.g., the example IN1 134A, the example IN2 134B, the example IN3 134C, and the example IN4 134D) of the AS1 104 using the IGP1. Likewise, the ASBR3 122, the ASBR4 124, the ASBR5 126 and the ASBR6 128 communicate with the internal nodes 136 (see FIG. 3) of the AS2 106 using the IGP2, and the ASBR5 126, the ASBR6 128 and the PE2 132 communicate with the internal nodes 138 of the AS3 108 using the IGP3.

In some examples, the example virtual router reflector 110 initiates a BGP communication session with the example autonomous system boundary router, ASBR1 114. During the communication session, the virtual router reflector 110 requests topology information for AS1 104. Responsive to the request, the ASBR1 114 redistributes the topology information for AS1 104 into a format that is transferrable using an EBGP. Redistribution, as used herein, refers to the process by which the internal topology of an autonomous system is converted into a protocol for suitable transmission to an external destination. One such example protocol is BGP-LS. A method used to redistribute topology information from an autonomous system to a format suitable for transmission via BGP is described in the Internet Draft distributed by the Internet Engineering Task Force (IETF) titled, "North-Bound Distribution of Link-State and TE Information using BGP, draft-ietf-idr-ls-distribution-10." Although BGP-LS is used as an example protocol for transmitting the topology information of the AS1 104 to the virtual router reflector 110, any routing communication protocol capable of permitting the transmission of autonomous system topology information to external network(s) may be used.

In addition to requesting the first topology information, the virtual route reflector 110 requests external routing information from the ASBR1 114. In some examples, the ASBR1 114 responds to the request by delivering a set of routes to external network destinations (i.e., network destinations that are external to the autonomous system AS1 104). In some examples, the set of routes delivered by the ASBR1 114 include a list of external network destinations that can be reached by any of the border routers of the first autonomous system (e.g., the ASBR1 114, the ASBR2 1165, the PE1 120) and further identifies the respective border routers that can reach each such external network destination.

The example virtual router reflector 110 selects a node within the example autonomous system, AS1 104, and uses the location of that node within the topology of the AS1 104 as a virtual position (also referred to as a pseudo location).

Thus, the virtual route reflector 110 "pretends" to be located at the selected node when determining a set of paths to be used to reach external network destinations that are accessible via the example ASBR1 114, the example ASBR2 116 and/or the example PE1 120. In some such examples, the virtual route reflector 110 uses the list of external routes to select a target network destination from the list of external network destinations and further uses the list of routes to identify the border routers (e.g., the ASBR1 114, the ASBR2 116, and the PE2 120) of AS1 104 that are capable of reaching the target network destination.

Next, the example virtual route reflector 110 uses any desired method including, for example, Dijkstra's algorithm to select/determine a "best" path from the selected node (the virtual position) to one of the border routers (e.g., the ASBR1 114, the ASBR2 116, and the PE2 120) through which the target network destination can be reached. In some such examples, the best path is selected as the path from the selected node (at which the virtual route reflector is virtually positioned) to the nearest of the autonomous system border routers (e.g., the ASBR1 114, the ASBR2 116, and the PE2 120) that are capable of "reaching" the desired exterior destination to thereby achieve hot potato routing. The virtual route reflector 110 then transmits, via the core backbone 102, the selected best path to the ASBR1 114, for example, for distribution to the internal nodes (e.g., IN1 134A, the IN2 134B, the IN3 134C, and the IN4 134D) of the AS1 104 for use in reaching the desired destination.

In some examples, virtual route reflector selects, from the list of external routes, the ASBR3 122 associated with the AS2 106 as the target destination and further uses the list of external routes to determine that either of the ASBR1 114 or the ASBR2 116 can be used by the internal nodes 134 of the AS1 104 to reach the target destination (e.g., both the ASBR1 114 and the ASBR2 116 advertise a route(s) to the target network destination). In some such examples, the virtual route reflector 110 selects the first node IN1 134A as the node from which to calculate a best path. In some such examples, the virtual route reflector 110 uses a path selection algorithm to determine whether a first link ("link1") between the first node IN1 134A and the ASBR1 114 is shorter than a second link ("link2") between the first node IN1 134A and the ASBR2 116. In some such examples, the virtual route reflector 110 determines that the link1 is the shorter path and thus the link1 is selected as the best path. In some examples, the path selector builds a path tree and sets itself as the origin of the tree to identify the shortest path. Thus, the ASBR1 114 associated with the link1 represents the "nearest" point of egress from the virtual position (e.g., the first node IN1 134A). In some such examples, the virtual route reflector 110 selects a best route to the target network destination as being the route that travels through the ASBR1 114 and subsequently advertises that route to the internal nodes 134 of the AS1 104. The internal nodes 134 of the AS1 104 then use that route for transmission of packets intended for the target network destination, ASBR3 122.

In some examples, instead of using a single selected node as the virtual position of the virtual route reflector 110, the virtual route reflector 110 iteratively performs the path selection process. During each such iteration, the virtual route reflector 110 virtually positions itself at one of the internal nodes 134 and subsequently selects a best path extending from the virtual position to the target network destination. The process is repeated for each of the internal nodes 134 until a best path is selected for each of the internal nodes 134. For example, the virtual route reflector 110 may determine that although the link1 is the best path by which the first node IN1 134A can reach the target network destination, a link3 represents a best path by which IN2 134B can reach the target network destination. Consequently, the virtual route reflector 110 advertises, to the IN2 134B, a route that extends through the ASBR2 134B to reach the target network destination. In this manner, the virtual route reflector can determine a best path for each of the individual internal nodes 134 to reach each external network destination that is advertised by the border routers (e.g., the ASBR1 114, the ASBR2 116, the PE1 120) of the AS1 104.

As described further below, in some examples, the example virtual route reflector 110 performs route reflection operations for multiple autonomous systems. In some such examples, the virtual route reflector 110 obtains network topology information from multiple autonomous systems (e.g., the example AS1 104, the example AS2 106 and the example AS3 108). In some such examples, the virtual route reflector 110 uses the topology information of each autonomous system (e.g., the AS1 104, the AS2 106, and the AS3 108) to calculate paths to be used by the internal nodes 134, 136, 138 of each of the multiple autonomous systems (e.g., AS1 104, the AS2 106, and the AS3 108) to reach target destinations exterior to the autonomous systems (e.g., AS1 104, the AS2 106, and the AS3 108).

As described in greater detail below with reference to FIG. 3, in some examples, the example virtual route reflector 110 uses second topology information of the example AS2 106 and third topology information of the AS3 108 to select a "best" path from a selected one of the internal nodes 136 of the AS2 106 to a selected one of the internal nodes 138 of the AS3 108. In some such examples, the virtual route reflector identifies the autonomous system boundary router (e.g., ASBR5 126) through which the path travels and subsequently advertises that router to the selected ones of the internal nodes of the AS2 106 and the AS3 108 for use in communicating therebetween.

Figure 2:
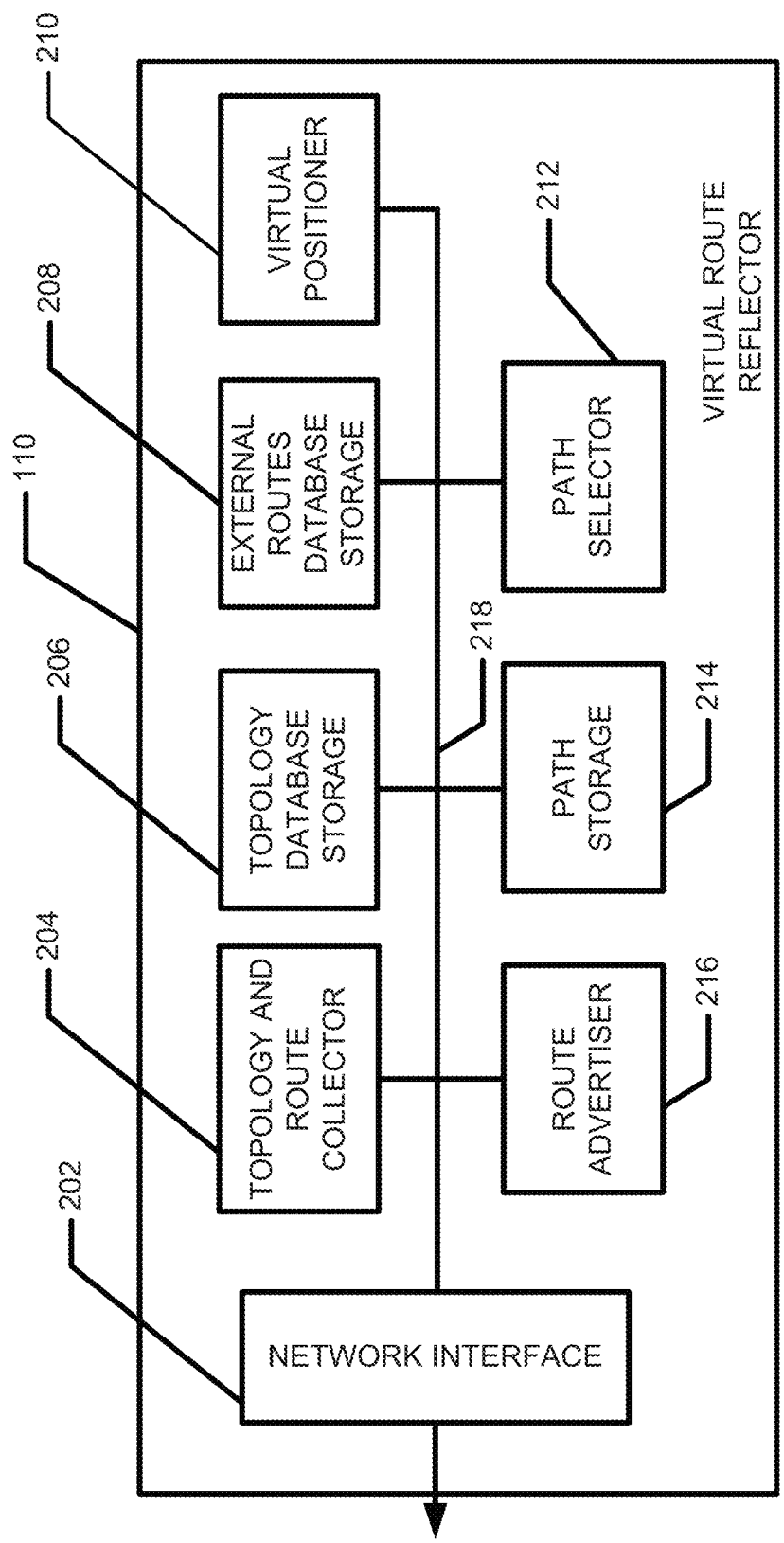
FIG. 2 is a block diagram of an example implementation of the example virtual route reflector illustrated in FIG. 1.

A block diagram illustrating an example implementation of the example virtual route reflector 110 of FIG. 1 is shown in FIG. 2. In some examples, the virtual route reflector 110 includes an example network interface 202, an example topology and route collector 204, an example topology database storage 206, an example external routes database storage 208, an example virtual positioner 210, an example path selector 212, an example path storage 214, and an example route advertiser 216 coupled together via a communication bus 218.

Referring now to FIG. 1 and FIG. 2, in some examples, the virtual route reflector 110 operates as a route reflector for the first autonomous system, AS1 104. In some such examples, the example network interface 202 of the virtual route reflector 110 begins a BGP-LS communication session with any of the boundary routers of the AS1 104 (e.g., any of the ASBR1 114, the ASBR2 116 and the PE1 120). In some such examples, the network interface 202 begins the session with the ASBR1 114. During the communication session, the example topology collector 204 requests that the ASBR1 114 transmit topology information describing the topology of the AS1 104 ("the AS1 topology information"). In response, the ASBR1 114 transmits the AS1 topology information in any exterior gateway protocol capable of carrying autonomous system topology information such as, for example, BGP-LS. In some such examples, the AS1 topology information identifies the example nodes of the AS1 104 (e.g., the IN1 134A, the IN2 134B, the IN3 134C, the IN4 134D) and further identifies links by which the IN1 134A, the IN2 134B, the IN3 134C, the IN4 134D are coupled. In some examples, the AS1 topology information also identifies a cost (also called a metric), associated with each link. The cost of associated with a link represents the overhead required to send packets across that link. Typically, a higher cost is associated with a lower bandwidth and a lower cost is associated with a higher bandwidth. In some such examples, the cost information can be transmitted using an accumulated internal gateway protocol (AIGP) attribute which can be set by enabling the ASBR1 to process AIGP information. The topology and route collector 204 causes the topology information to be stored in the example topology database 206.

In some examples, during the communication session with the example ASBR1 114, the example topology and route collector 204 also requests that the ASBR1 114 transmit external network routing information identifying external routes that are advertised by the border routers of the first autonomous system AS1 104 (e.g., the ASBR1 114, the ASBR2 116, the PE1 120). Thus, for example, the external network routing information identifies external network destinations and each of the border routers of the first autonomous system AS1 104 (e.g., the ASBR1 114, the ASBR2 116, the PE1 120) that are capable of "reaching" the external network destinations. The external topology and route collector 204 stores the external routes in the example external routes database 208.

In some such examples, the example virtual positioner 210 of the virtual route reflector 110 selects any node (e.g., IN1 134A) in the AS1 104 and thereafter the virtual route reflector 110 uses the location of that node (IN1 134A) as a starting location in determining a nearest point of egress from the AS1 104 to the core backbone 102, for example. By using the location of the node IN1 134A as the starting location in determining a nearest point of egress from the AS1 104, the virtual route reflector is essentially "pretending" to be located at the first node IN1 134A. As used herein, when the virtual route reflector 110 "pretends" to be located at the first node IN1 134A, the virtual route reflector 110 is "virtually positioning" itself at the first node IN1 134A. Thus, the location at which the virtual route reflector 110 is "pretending" to be is also referred to as the "virtual position" of the virtual route reflector 110.

In some examples, the example path selector 212 of the virtual route reflector 110 uses the example external routes database 208 to identify an external network destination that can be reached by one or more of the border routers of the example AS1 104 (e.g., the example ASBR1 114, the example ASBR2 116, the example PE1 120). In some examples, the external network destination, also referred to as the target network destination, is the example ASBR3 122 associated with the AS2 106. In some such examples, the example path selector determines that the target network destination, ASBR3 122, can be reached via either the ASBR1 114 or the ASBR2 116. Next, the path selector 212 uses the node, link and cost information stored in the example topology database 210 to identify a "best" path from among the example link1 that extends between the virtual position (e.g., the location of the first node IN1 134A) and the ASBR1 114, and the example link2 that extends between the virtual position (e.g., the location of the first node IN1 134A) and the ASBR2 116.

In some examples, the example path selector 212 uses any technique, such as, for example, Dijkstra's algorithm, to determine the "best" path. In some such examples, the "best" path is identified as the path having the lowest associated cost. The path selector 212 causes information identifying the "best" path to be stored in the example path storage 214 of the virtual route reflector 110. Information identifying the "best" path can include the target destination and the ASBR associated with the "best" path. Thus, for example, if the link1 is determined to be the "best" path (as opposed to the linke2), then the information identifying the "best" path will include information identifying the address of the target network destination (e.g., the ASBR3 122) and information identifying the address of the boundary router associated with the link1 (in this example, the address of the ASBR1 114). The example route advertiser 216 incorporates the information identifying the best path stored in the path storage into an appropriate route protocol for transmission to the ASBR1 114. The example route advertiser 216 then advertises the generated route, via the example network interface 202, to the ASBR1 114, the ASBR2 116 and/or the PE1 120 for distribution to the internal nodes (e.g., the IN1134A, the IN2 134B, the IN3 134C and the IN4 134D) of the AS1 104. Subsequently, the internal nodes (e.g., the IN1134A, the IN2 134B, the IN3 134C and the IN4 134D, etc.) of the AS1 104 use the advertised route to transmit messages to the target destination, ASBR3 122. Thus, the boundary router (in this example, ASBR1 114) nearest to the virtual location will be used as the point of egress for messages transmitted to the ASBR3 122 by the nodes 134, to thereby effect hot potato routing.

In some examples, the example virtual route reflector 110, instead of virtually positioning itself at a single one of the internal nodes 134 of the AS1 104, virtually positions itself at each of the internal nodes 134 of the AS1 104 in an iterative fashion and determines which of the ASBR1 114 and the ASBR2 116 are nearest to each such internal node (e.g., the IN1 134A, the IN2 134B, the IN3 134C, or the IN4 134D) of the AS1 104. Based on that information, the virtual route reflector 110 advertises, to each respective internal node, a respective route by which the target network destination can be reached. In some such examples, a first route to reach the target destination that is advertised by the virtual route reflector 110 to the IN1 134A includes the boundary router (either the ASBR1 114 or the ASBR2 116) that is closest to the internal node IN1 134A. Likewise, a second route to reach the remote destination that is advertised by the virtual route reflector 110 to the IN2 134B includes the boundary router (either the ASBR1 114 or the ASBR2 116) that is closest to the internal node IN2 134B. Additionally, a third route and a fourth route to reach the remote destination advertised to the IN3 134C and the IN4 134D, respectively, includes the boundary router (either the ASBR1 114 or the ASBR2 116) that is closest to the internal node IN3 134B and the internal node IN4 134D, respectively.

In some such examples, the example virtual positioner 206 of the virtual route reflector 110 virtually positions itself at the location of the first internal node IN1 134A. The shortest path selector then uses the topology information stored in the example matrix storage 210 to determine which of the boundary routers (the ASBR1 134A and the ASBR2 134B) are nearest to the first internal node IN1 134A (e.g., to select the shortest path from the IN1 134A to a point of egress (boundary) router from the AS1 104 that is capable of reaching the remote destination. The path to the nearest of the boundary routers is selected as the shortest path and stored in the example path storage 214. The example route advertiser incorporates the shortest path into the route to be advertised, via the network interface 202, to the internal node IN1 134A. To identify the shortest path from each of the remaining internal nodes to a boundary router (e.g., the ASBR1 134A or the ASBR2 134B), the operations are repeated for each internal node (e.g., the virtual route reflector 110 virtually positions itself at the location of each internal node of the AS1 104), determines whether the ASBR1 134A or the ASBR2 134B is closer to the virtual position (e.g., determines which of a first path from the virtual position to the ASBR1 134A and a second path from the virtual position to the ASBR2 134B is shortest), incorporates the shortest path into the route, and advertises, to the internal node, the route by which the remote destination can be reached.

Figure 3:
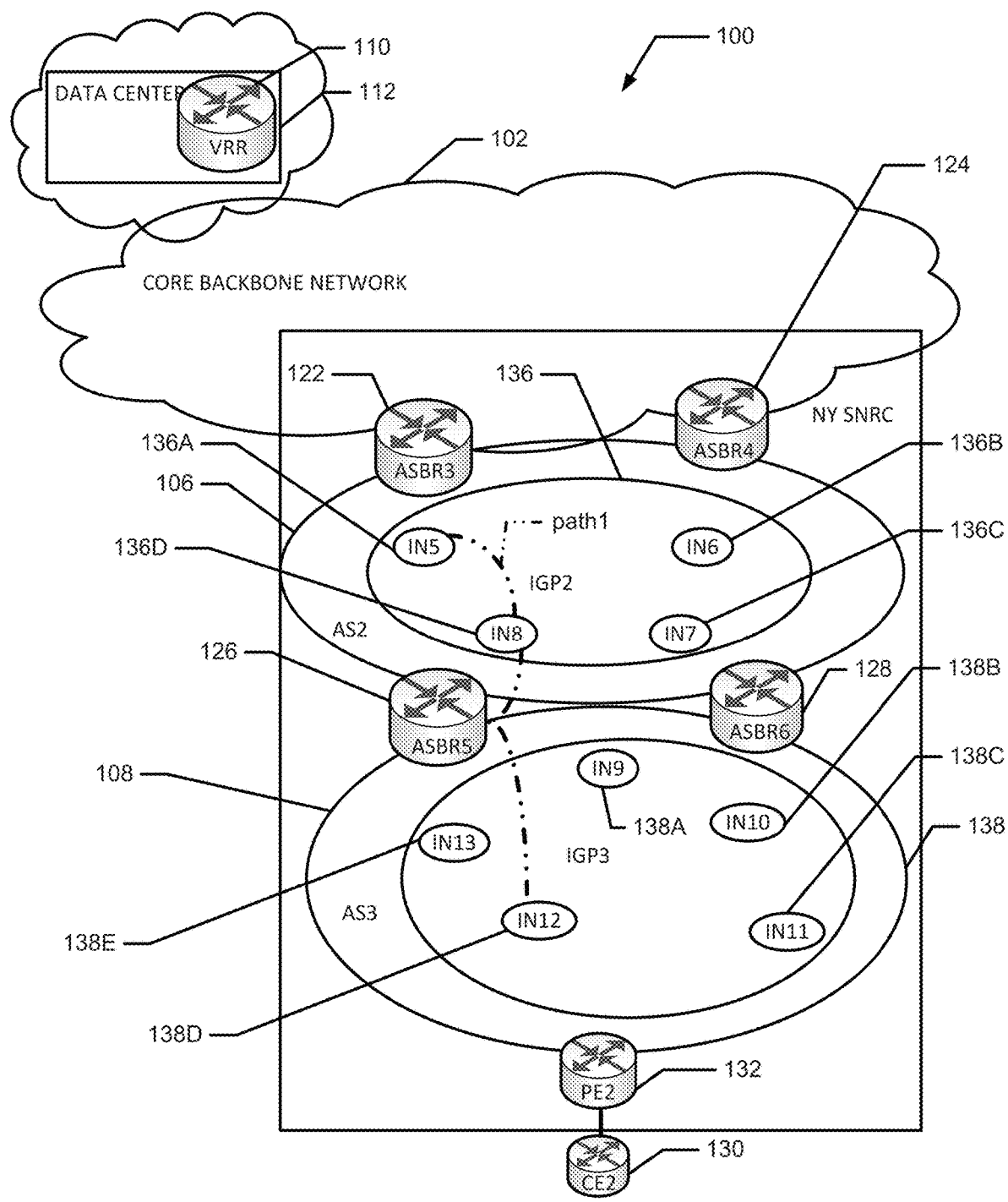
FIG. 3 is a schematic diagram of a portion of the example communication system network of FIG. 1 in which the example second autonomous system network and the example third autonomous system network are illustrated in greater detail.

The example second autonomous system 106 and the example third autonomous system AS3 108 of FIG. 1 are illustrated in further detail in FIG. 3. In some examples, the example internal nodes 136 in the second autonomous system 106 include an example fifth internal node IN5 136A, an example sixth internal node IN6 136B, an example seventh internal node IN7 136C, and an example eighth internal node IN8 136D. The example internal nodes 138 in the third autonomous system 106 include an example ninth internal node IN9 138A, an example tenth internal node IN10 138B, an example eleventh internal node IN11 138C, an example twelfth internal node IN12 138D and an example thirteenth internal node IN13 138E.

Referring now to FIG. 2 and FIG. 3, in some examples, the example virtual route reflector 110 residing in the example data center 112 operates as a route reflector for the example second autonomous system AS2 106 and for the example third autonomous system 108. In some such examples, when identifying a route from any node (e.g., the fifth node IN5 136A) in the second autonomous system AS2 106 to any other node (e.g., the eleventh internal node IN11 138C located in the third autonomous system AS3 108, the virtual route reflector 110 uses second topology information collected from the second autonomous system AS2 106 and uses third topology information collected from the third autonomous system AS3 108 to determine a shortest path between the fifth node IN5 136A and the eleventh node 138C. In some such examples, the virtual route reflector 110 selects the boundary router located on the shortest path (e.g., either the ASBR5 126 or the ASBR6 128) as the point of egress from the second autonomous system AS2 106 to be used by the fifth node IN5 136A when transmitting messages to the eleventh node IN11 138C. In some examples, the ASBR5 126 is located on the shortest path between the fifth node IN5 136A and the eleventh node IN11 138C. In some such examples, the virtual route reflector 110 generates and advertises a route to the fifth node IN5 136A that identifies the ASBR5 126 as the boundary router to which the fifth node IN5 136A is to deliver messages when the intended remote destination for the messages is the eleventh node IN11 138C located in the second autonomous system AS2 106. Similarly, the virtual route reflector 110 generates and advertises a route to the eleventh node IN11 138C that identifies the ASBR5 126 as the boundary router to which the eleventh node IN11 138C is to deliver messages when the intended remote destination for the messages is the fifth node IN5 136A located in the third autonomous system AS3 108.

Referring now to FIG. 1, FIG. 2 and FIG. 3, in some example, the example virtual route reflector is configured to operate as a route reflector for the example first autonomous system AS1 104, the example second autonomous system AS2 106, and the example third autonomous system AS3 108. In some such examples, the example topology and route collector 204 of the virtual route reflector collects first topology information, second topology information and third topology information from any of the boundary routers associated with the first autonomous system AS1 104, the second autonomous system AS2 106, and the third autonomous system AS3 108, respectively. Additionally, the example topology and route collector 204 collects external routing information identifying external network destinations reachable by one or more of the boundary routers associated with the AS1 104, the AS2 106 and the AS3 108, respectively, and further identifying the respective boundary routers through which each respective, external network destination can be reached. The topology and route collector 204 stores the topology information in the example topology database 206 and stores the external routing information in the example external routes database 208.

Additionally, the example virtual positioner 210 virtually positions itself in each of the three autonomous systems (AS1 104, AS2 106, AS3 108) in the manner described above. Using the virtual positions, the topology information and the external routing information, the example path selector 212 determines best paths from one or more of the nodes (e.g., IN1 134A, IN2 134B, IN3 134C, IN4 134D) in the first autonomous system AS1 104 to one or more of the nodes (e.g., IN5 136A, IN6 136B, IN7 136C, IN8 136D) in the second autonomous system AS2 106 and to one or more of the nodes in the third autonomous system AS3 108. Likewise, the path selector 212 identifies a set of shortest paths from one or more of the nodes (e.g., IN5 136A, IN6 136B, IN7 136C, IN8 136D) in the second autonomous system AS2 106 to one or more of the nodes (e.g., IN1 134A, IN2 134B, IN3 134C, IN4 134D) in the first autonomous system AS1 104 and to one or more of the nodes (e.g., IN9 138A, IN10 138B, IN11 138C, IN12 138D, IN13 138E) in the third autonomous system AS3 108. The shortest paths are stored in the example path storage 214 and then incorporated into a set of routes by the example route advertiser 216 for transmission to respective ones of the autonomous systems (e.g., the AS1 104, the AS2 104, the AS3 106).

While an example manner of implementing the virtual route reflector 110 of FIG. 1 and FIG. 3 is illustrated in FIG. 2, one or more of the elements, processes and/or devices illustrated in FIG. 2 may be combined, divided, re-arranged, omitted, eliminated and/or implemented in any other way. Further, the example network interface 202, the example topology and route collector 204, the example topology database storage 206, the example external routes database storage 208, the example virtual positioner 210, the example path selector 212, the example path storage 214 and the example route advertiser 216 and/or, more generally, the example virtual router reflector 110 of FIG. 2 may be implemented by hardware, software, firmware and/or any combination of hardware, software and/or firmware. Thus, for example, any of the example network interface 202, the example topology and route collector 204, the example topology database storage 206, the example external routes database storage 208, the example virtual positioner 210, the example path selector 212, the example path storage 214 and the example route advertiser 216 and/or, more generally, the example virtual route reflector 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example topology and route collector 204, the example topology database storage 206, the example external routes database storage 208, the example virtual positioner 210, the example path selector 212, the example path storage 214, and/or the and the example route advertiser 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example virtual route reflector 110 of FIG. 1 and FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the virtual route reflector 110 of FIGS. 1, 2 and 3 are shown in FIGS. 4, 5, 6 and 7. In these examples, the machine readable instructions comprise a program for execution by a processor such as the processor 1012 shown in the example processor platform 1000 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 4, 5, 6 and 7 many other methods of implementing the example virtual route reflector 110 may alternatively be used. For example, the order of execution of the blocks may be changed, and/or some of the blocks described may be changed, eliminated, or combined.

As mentioned above, the example processes of FIGS. 4, 5, 6 and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, 6, and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
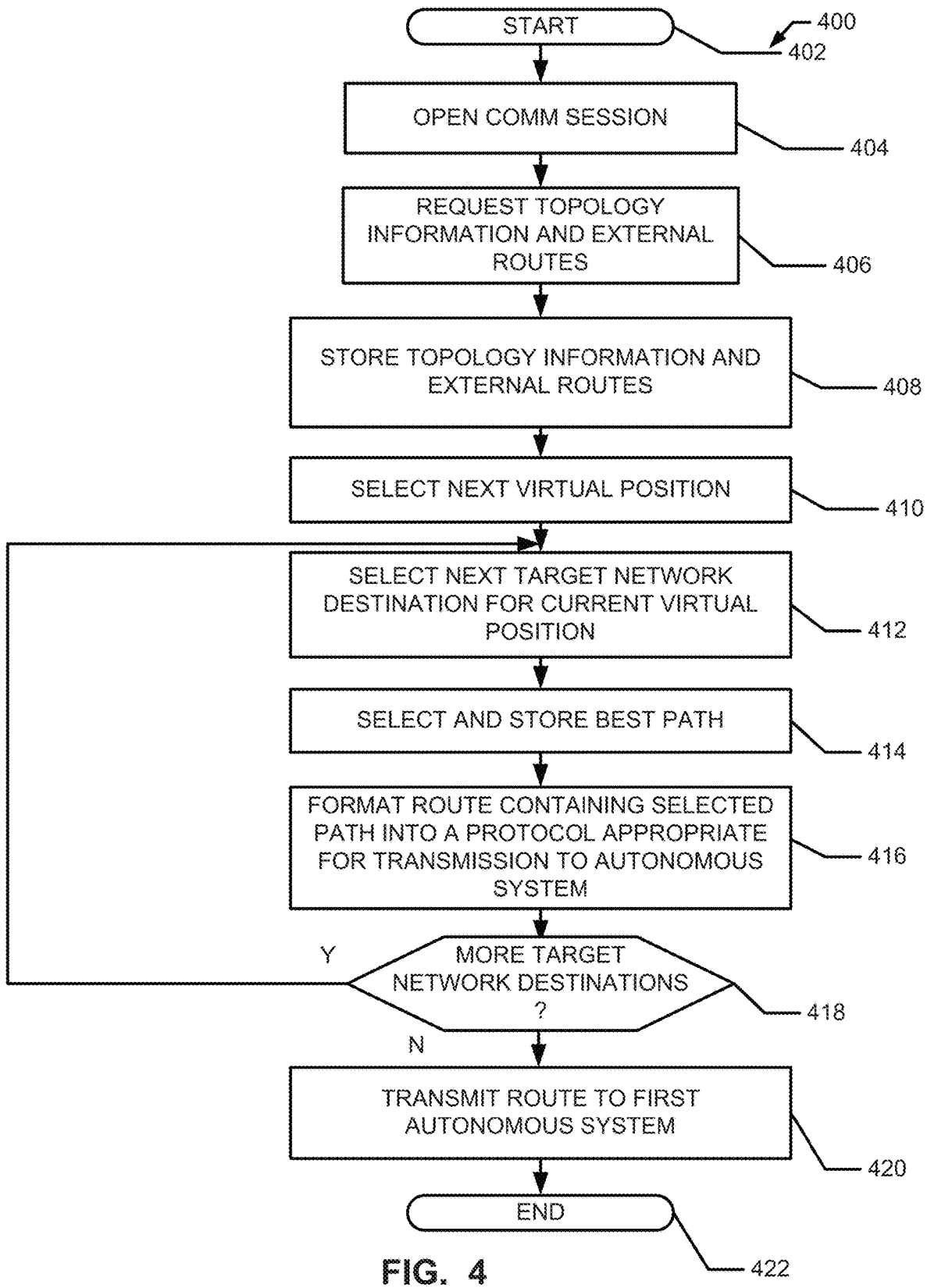
FIG. 4 is a flowchart representative of first example computer readable instructions that can be executed by the example virtual route reflector illustrated in FIG. 1, FIG. 2 and/or FIG. 3.

The program 400 of FIG. 4 represents a method by which the example virtual route reflector 110 performs route reflection for an autonomous system (e.g., the AS1 104) from a location outside of the AS1 104 by virtually positioning itself at a single node located within the AS1 104. With reference also to FIG. 1 and FIG. 2, the method begins at a block 402 after which the example network interface 202 (see FIG. 2) of the example virtual route reflector 110 (see FIG. 2) initiates a BGP communication session with the example autonomous system boundary router, ASBR1 114 (see FIG. 1) (block 404). During the communication session, the example topology collector 204 requests topology information for the AS1 104 (block 406). Responsive to the request, the ASBR1 114 accesses one or more topology databases (e.g., a link state database, a traffic engineering database, etc.) to obtain first topology information describing the topology of the first autonomous system AS1 104. In addition, the ASBR1 114 redistributes the first topology information into a format that is transferrable using an EBGP such as, for example BGP-LS. BGP-LS is a protocol into which topology information of an autonomous system can be formatted for transmission outside of the autonomous system. A method used to redistribute topology information from an autonomous system to a format suitable for transmission via BGP is described in the Internet Draft distributed by the Internet Engineering Task Force (IETF) titled, "North-Bound Distribution of Link-State and TE Information using BGP, draft-ietf-idr-ls-distribution-10," Although BGP-LS is used as an example protocol for transmitting the topology information of the AS1 104 to the virtual router reflector 110, any routing communication protocol capable of permitting the transmission of autonomous system topology information to external network(s) may be used.

The example topology and route collector 204 then stores the first topology information in the example topology database storage 206 (block 408). In some examples, the topology and route collector 204 generates the topology database by using the first topology information to identify each of the nodes residing in the first AS1 104 (e.g., IN1 134A, IN2 134B, IN3 134C, IN4 134D, etc.) and the links by which the nodes are linked. The topology and route collector 204 also uses the topology information to identify a cost (or metric) associated with each link.

During the communication session with the ASBR1 114, the example topology and route collector 204 also requests that the ASBR1 114 transmit external network routing information identifying external routes that are advertised by the border routers (e.g., the ASBR1 114, the ASBR2 116, the PE1 120) of the first autonomous system AS1 104 (also block 404). Thus, for example, the external network routing information identifies external network destinations and a set of corresponding border routers (e.g., the ASBR1 114, the ASBR2 116, the PE1 120) of the first autonomous system AS1 104 that are capable of "reaching" the external network destinations. The topology and route collector 204 stores the external routes in the example external route database (also block 406).

In some examples, the example virtual positioner 210 of the virtual route reflector 110 uses the first topology information to select a next (or a first, during the first iteration of the program 400) node residing within the example first autonomous system AS1 104 (block 410). The location of the selected node within the AS1 104 will be used as the virtual position of the virtual route reflector 110 as described below. The virtual positioner 206 may select the node at random or using any desired criteria such as, for example, based on a user input, based on a set of rules, etc. As described in greater detail below, the example path selector 212 then uses the location of that node within the topology of the first autonomous system AS1 104 as a virtual position for the virtual route reflector 110 (i.e., the path selector 212 uses the location of the selected node as the location of the virtual route reflector 110) from which to select/calculate a "best" path by which any of the internal nodes (e.g., any of the IN1 134A, the IN2 134B, the IN3 134C and the IN4 134D) of the first autonomous system AS1 104 may reach a target network destination external to the first autonomous system AS1 104.

Additionally, the example path selector 212 uses the external route database stored in the example external route database storage 208 to identify a target network destination, such as the ASBR3 122, that is external to the first autonomous system AS1 104 and that is reachable by one or more of the border routers, such as the ASBR1 114, and the ASBR2 116, of the first autonomous system 104 (block 412). The path selector 212 uses any desired method including, for example, Dijkstra's algorithm to select a "best" path from the virtual position to either of the ASBR1 114 or the ASBR2 116. In some such examples, the best path is selected as the path from the virtual position to the "nearest" of the ASBR1 114 and the ASBR2 116 to thereby achieve hot potato routing. In some such examples, the costs associated with the example link1 between the virtual position and the first ASBR1 114 and the costs associated with the example link2 between the virtual position and the second ASBR2 116 are compared. In some such examples, a lower cost is associated with a shorter distance. Thus, if the cost of the first link is less than the cost of the second link, then the first ASBR1 is determined to be "nearer" to the virtual position and the first link is selected as the "best" path. As a result, the path selector 212 stores information identifying the first link in the example path storage 214 (block 414). In some examples, the information identifying the first link (i.e., the selected path) includes the address of the target network destination (in this example ASBR3 122) and also identifies the address of the border router of AS1 104 that is "nearest" to the virtual position (in this example, ASBR1 114) and any other desired route information. If needed, the example route advertiser 216 then converts the information identifying the selected path into a route protocol or format that is suitable for transmission to the ASBR1 114 (e.g., BGP-LS) (block 416).

Next, the example path selector 212 determines whether there are any external network destinations in the external routes database for which a best path has not yet been selected (block 418). If so, control returns to the block 412 at which the path selector 212 selects a next external network destination from the external routes database storage 208 to be the target network destination and control proceeds thereafter in the manner described above. If a best path has been selected for every external network destination in the external routes database (as determined at the block 418), the example route advertiser 216 provides the route information containing the selected paths to the example network interface 202 for transmission to the ASBR1 114 via the core backbone 102 (block 420) and the method ends (block 422). Upon receipt of the advertised routes, the ASBR1 114 supplies the routes to the internal nodes 134 (e.g., IN1 134A, the IN2 134B, the IN3 134C, the IN4 134D, etc.) of the AS1 104 for use in reaching the corresponding target network destinations. For example, the internal nodes 134 of the AS1 104 will transmit messages intended for the target network destination of the ASBR3 122 to the ASBR1 114 for subsequent transmission to the ASBR3 122 based on the "best" path selected for the ASBR3 122. Although "best path" as used herein typically refers to a path having a lower cost than other paths, the terms could instead be used to describe a path meeting any desired criteria.

Figure 5:
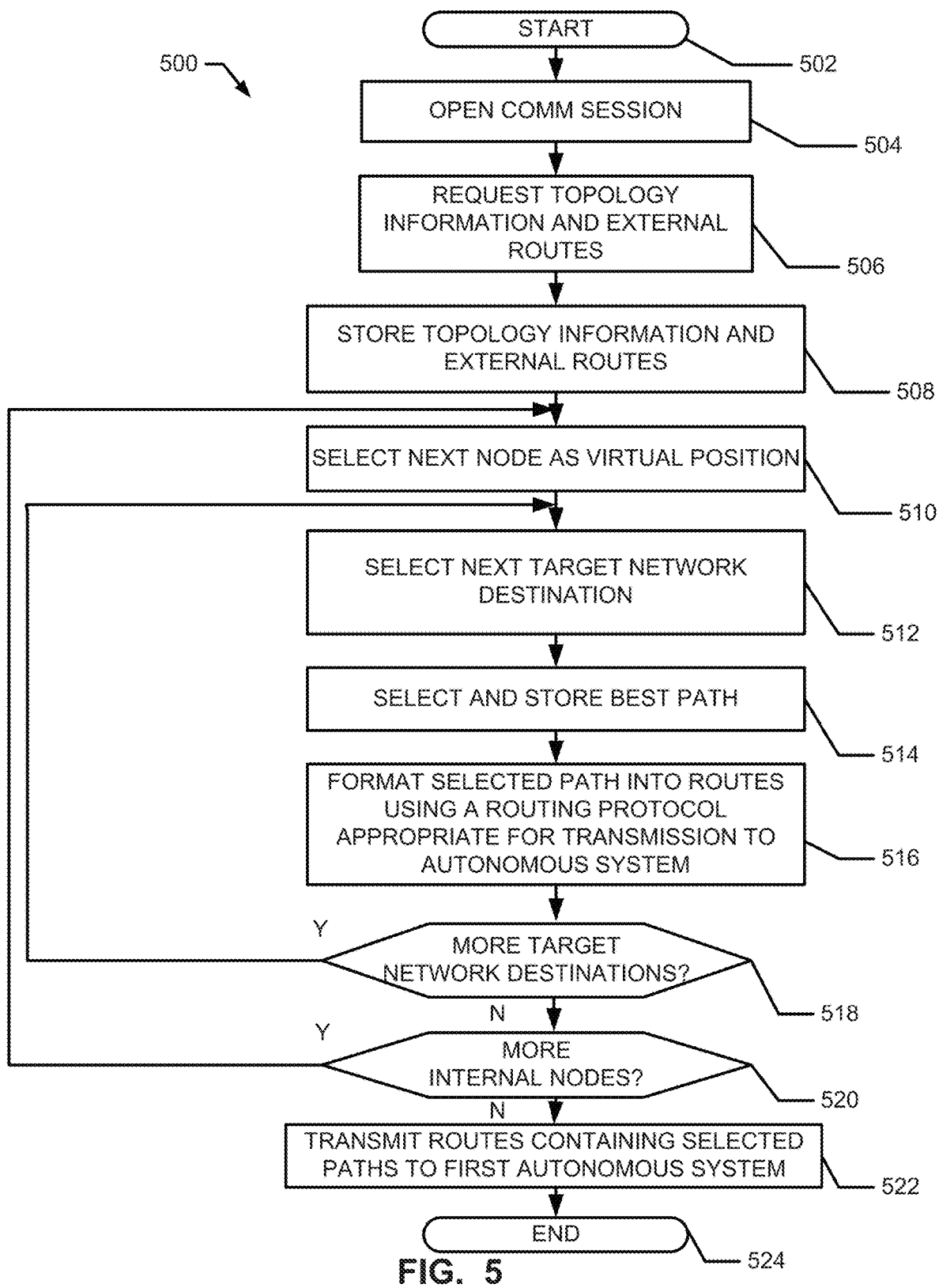
FIG. 5 is a flowchart representative of second example computer readable instructions that can be executed by the example virtual route reflector illustrated in FIG. 1, FIG. 2 and/or FIG. 3.

Referring now to FIG. 5, a program 500 represents a method by which the example virtual route reflector 110 performs route reflection for an autonomous system (e.g., the AS1 104) from a location outside of the AS1 104 by virtually positioning itself at multiple locations within the AS1 104. Referring also to FIG. 1 and FIG. 2, the method begins at a block 502 after which the example network interface 202 (see FIG. 2) of the example virtual route reflector 110 (see FIG. 1 and FIG. 2) initiates a BGP communication session with the example autonomous system boundary router, ASBR1 114 (or any of the other border routers of the AS1 104) (see FIG. 1) (block 504). During the communication session, the example topology collector 204 requests first topology information for the AS1 104 (block 506). Responsive to the request, the ASBR1 114 accesses one or more topology databases (e.g., a link state database, a traffic engineering database, etc.) to obtain first topology information describing the topology of the first autonomous system AS1 104. In addition, the ASBR1 114 redistributes the first topology information into a format that is transferrable using an EBGP such as, for example BGP-LS. The example topology and route collector 204 then stores the first topology information in the example topology database storage 206 (block 508). In some examples, the topology and route collector 204 generates the topology database by using the first topology information to identify each of the nodes residing in the first AS1 104 (e.g., IN1 134A, IN2 134B, IN3 134C, IN4 134D, etc.) and the links by which the nodes are linked. The topology and route collector 204 also uses the topology information to identify a cost (or metric) associated with each link.

During the communication session with the ASBR1 114, the example topology and route collector 204 also requests that the ASBR1 114 transmit external network routing information identifying external routes that are advertised by the border routers (e.g., the ASBR1 114, the ASBR2 116, the PE1 120) of the first autonomous system AS1 104 (also block 506). Thus, for example, the external network routing information identifies external network destinations and a set of corresponding border routers (e.g., the ASBR1 114, the ASBR2 116, the PE1 120) of the first autonomous system AS1 104 that are capable of "reaching" the external network destinations. The topology and route collector 204 stores the external routes in the example external route database (also block 508).

In some examples, the example virtual positioner 210 of the example virtual route reflector 110 uses the first topology information to select a next internal node residing within the example first autonomous system AS1 104 (block 510). On the first iteration of the method of FIG. 5, the virtual positioner 210 selects a first of the internal nodes 134 (e.g., IN1 134A)). The location of the selected node within the AS1 104 will be used as the virtual position of the virtual route reflector 110 to select paths as described in greater detail below.

Additionally, the example path selector 212 uses the external route database stored in the example external route database storage 208 to identify a next target network destination (or a first target network destination during the first iteration of the program 500), such as the ASBR3 122, that is external to the first autonomous system AS1 104 and that is reachable by one or more of the border routers, such as the ASBR1 114, and the ASBR2 116, of the first autonomous system 104 (block 512). Next, the path selector 212 uses any desired method including, for example, Dijkstra's algorithm to select a "best" path from the virtual position to either of the ASBR1 114 or the ASBR2 116. In some such examples, the best path is selected as the path from the virtual position to the "nearest" of the ASBR1 114 and the ASBR2 116 to thereby achieve hot potato routing. In some such examples, the costs associated with the example link1 between the virtual position and the first ASBR1 114 and the costs associated with the example link2 between the virtual position and the second ASBR2 116 are compared. In some such examples, a lower cost is associated with a shorter distance. Thus, if the cost of the first link is less than the cost of the second link, then the first ASBR1 is determined to be "nearer" to the virtual position and the first link is selected as the "best" path. As a result, the path selector 212 stores information identifying the first link in the example path storage 214 (block 514). In some examples, the information identifying the first link (i.e., the selected path) includes the address of the target network destination (in this example ASBR3 122) and also identifies the address of the border router of AS1 104 that is "nearest" to the virtual position (in this example, ASBR1 114) and any other desired route information. If needed, the example route advertiser 216 then converts the information identifying the selected path into a route using a routing protocol or format that is suitable for transmission to the ASBR1 114 (e.g., BGP-LS) (block 516).

Next, the example path selector 212 determines whether there are any external network destinations in the external routes database for which a best path has not yet been selected (block 518). If so, control returns to the block 510 at which the path selector 212 selects a next external network destination from the external routes database storage 208 to be the target network destination and control proceeds thereafter in the manner described above. If a best path has been selected for every external network destination in the external routes database (as determined at the block 518), the virtual positioner 210 determines if there are any internal nodes 134 within the autonomous system (e.g., AS1 104) for which best paths have not yet been selected (block 520). If best paths have not yet been selected for any of the internal nodes 134, control returns to the block 510 at which the virtual positioner 210 selects a next internal node (e.g., any of the IN2 134B, the IN3 124C and the IN4 134D that have not yet been processed) and thereafter control proceeds to the blocks subsequent thereto as described above. In this manner, the method represented by the program 500 determines a respective set of best paths by which each of the respective internal nodes of the AS1 104 can reach external network destinations. If, at the block 518, the virtual positioner 210 determines that best paths have been selected for all of the internal nodes 134, the example route advertiser 216 provides the route information containing the selected paths to the example network interface 202 for transmission to the ASBR1 114 via the core backbone 102 (block 522) and the method ends (block 524).

Upon receipt of the advertised routes, the ASBR1 114 supplies the respective routes to the respective internal nodes 134 (e.g., IN1 134A, the IN2 134B, the IN3 134C, the IN4 134D, etc.) of the AS1 104 for use in reaching the corresponding target network destinations. Thus, each of the respective internal nodes 134 is supplied a respective set of best paths for use in reaching a respective, nearest point of egress for each external network destination.

Figure 6:
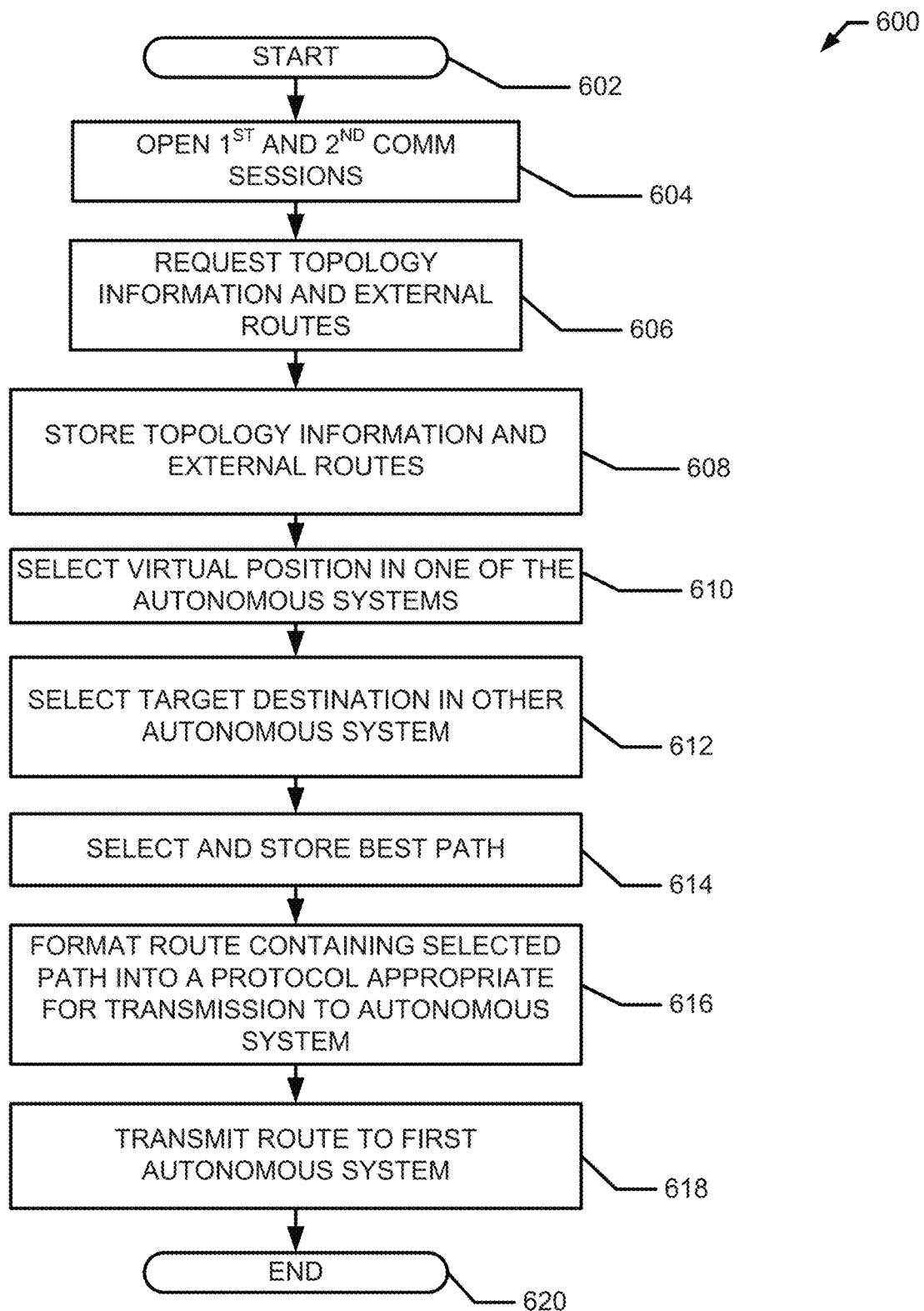
FIG. 6 is a flowchart representative of third example computer readable instructions that can be executed by the example virtual route reflector illustrated in FIG. 1, FIG. 2 and/or FIG. 3.

Referring now to FIG. 6, a program 600 represents a method by which the example virtual route reflector 110 performs route reflection for an autonomous system (e.g., the AS2 106) from a location outside of the AS2 106 by virtually positioning itself a location within the AS2 106. As described below, in the method represented by the program 600, the virtual route reflector 110 uses second topology information describing the topology of the AS2 106 and third topology information describing the topology of another autonomous system (e.g., the AS3 108) to determine best paths between nodes located in the AS2 104 and the AS3 106. Referring also to FIG. 1 and FIG. 2, the method 600 begins at a block 602 after which the example network interface 202 (see FIG. 2) of the example virtual route reflector 110 (see FIG. 1 and FIG. 2) initiates a first BGP communication session with the example autonomous system boundary router, ASBR3 122 (or any of the other border routers of the AS2 106) (see FIG. 1) and further initiates a second BGP communication session with the example autonomous system boundary router ASBR5 126 (see FIG. 1) (block 604) of the AS3 108. During the first BGP communication session, the topology and route collector 204 (see FIG. 2) requests second topology information for the AS2 106 (block 606) from the ASBR 3 122 and during the second BGP communication session, the topology and route collector 204 requests third topology information for the AS3 108 from the ASBR5 126 (block 606). In some examples, the virtual route reflector 110 is unable to directly communicate with the ASBR5 126. In some such examples, the virtual route reflector 110 instructs the ASBR3 122 to request the third topology information from the ASBR5 126.

Responsive to the request, the ASBR3 122 accesses one or more topology databases associated with the AS2 106 (e.g., a link state database, a traffic engineering database, etc.) to obtain second topology information describing the topology of the second autonomous system AS2 106. In addition, the ASBR3 122 redistributes the second topology information into a format that is transferrable using an EBGP such as, for example BGP-LS. Similarly, the ASBR5 126 accesses one or more topology databases associated with the AS3 108 (e.g., a link state database, a traffic engineering database, etc.) to obtain the third topology information describing the topology of the third autonomous system AS3 108. In addition, the ASBR5 126 redistributes the third topology information into a format that is transferrable using an EBGP such as, for example, BGP-LS.

In some examples, the topology and route collector 204 uses the second topology information to identify each of the nodes residing in the AS2 106 (e.g., IN5 136A, IN6 136B, IN7 136C, IN7 136D, etc.) and the links by which the nodes are coupled. The topology and route collector 204 also uses the second topology information to identify a cost (or metric) associated with each link in the AS2 106. Likewise, the topology and route collector 204 uses the third topology information to identify each of the nodes residing in the AS3 108 (e.g., IN9 138A, IN10 138B, IN11 138C, IN12 138D, IN13 138D etc.) and the links by which the nodes are coupled. The topology and route collector 204 also uses the third topology information to identify a cost (or metric) associated with each link in the AS3 108.

During the first communication session with the ASBR3 122, the example topology and route collector 204 also requests that the ASBR3 122 transmit external network routing information identifying external routes that are advertised by the border routers (e.g., the ASBR3 122, the ASBR4 124) of the second autonomous system AS2 108 (also block 606). During the second communication session with the ASBR5 126, the example topology and route collector 204 also requests that the ASBR5 126 transmit external network routing information identifying external routes that are advertised by the border routers (e.g., the ASBR5 126, the ASBR6 128 and the PE2 132) of the third autonomous system AS3 132 (also block 606).

The example topology and route collector 204 stores the second and the third topology information as a topology database in the example topology database storage 206 (block 608) and stores the external routes in the example external route database (also block 608).

In some examples, the example virtual positioner 210 of the example virtual route reflector 110 uses the second topology information to select an internal node (in this example IN5 136A) residing within the example second autonomous system AS2 106 (block 610). The location of the selected node IN5 136A within the AS1 104 will be used as the virtual position of the virtual route reflector 110 to select paths as described in greater detail below.

Additionally, the example path selector 212 uses the third topology information stored in the topology database storage 206 (see FIG. 2) to identify and select an internal node in the AS3 108, such as the IN12 138D (block 612). Next, the path selector 212 uses any desired method including, for example, Dijkstra's algorithm to select a "best" path from the virtual position (e.g., from the IN5 136A) to the IN12 138D located in the AS3 108. In some such examples, the best path is selected as the path from the virtual position to the IN12 138D having a lowest overall cost as compared to other possible paths between the virtual position and the IN12 138D. In some such examples, the costs associated with any links that, together, form a path are combined to formulate an accumulated IGP cost (also known as an AIGP cost). Example techniques that can be used to obtain an AIGP cost for a path having links from more than a single autonomous system are described in a Request for Comment no. 7311 entitled, "The Accumulated IGP Metric Attribute for BGP" published by the Internet Engineering Task Force (IETF). In some examples, the path selector calculates an AIGP cost for each possible path between the virtual position and the IN12 138D and then selects the path having the lowest cost.

After identifying the shortest path, the path selector 212 stores information identifying the shortest path and further identifying the AIGP cost associated with the shortest path in the example path storage 214 (block 614). In some examples, the information identifying the shortest path (i.e., the selected path) includes the address of the autonomous system boundary router that lies along the selected path. Thus, for example, assuming that a first path path1 (see FIG. 3) extending from the virtual position (e.g., the IN5 136A) to the destination node (e.g., IN12 138D) is the shortest path between the two nodes and, therefore, is the selected path, the ASBR5 126 is identified as the autonomous system boundary router that lies along the selected path. As a result, the address of the ASBR5 126 is stored with the information identifying the selected path in the path storage 214 (block 616). Additionally, information identifying the address of the source of the selected path (in this example, the IN5 136A) and the destination of the selected path (in this example, the IN12 138D) is also included in the selected path information.

If needed, the example route advertiser 216 then converts the information identifying the selected path into a route using a routing protocol or format (e.g., BGP-LS with the AIGP attribute enabled) that is suitable for transmission to the ASBR3 122 and to the ASBR5 126 (block 618). The example route advertiser 216 then provides the route information containing the selected path to the example network interface 202 for transmission to the ASBR3 122 and the ASBR5 126 (block 620) and the method ends (block 622).

Upon receipt of the advertised route, the ASBR3 122 supplies the route to the internal node IN5 136A of the AS2 106 for use in reaching the internal node IN12 138D of the AS3 108. Likewise, the ASBR5 126 supplies the route to the internal node IN12 138D of the AS3 108 for use in reaching the internal node IN5 136A of the AS2 106.

In some examples, the method represented by the program 600 is repeated until a "best" path between each internal node residing in the AS2 106 and each internal node residing in the AS3 108 has been selected and information identifying the best paths has been transmitted to the corresponding autonomous systems. Thus, the method represented by the program 600 can be used to improve routing efficiency between two autonomous systems that use the same IGP or different IGPs provided that when the IGPs used by the two autonomous system are different, the administrator takes measures to ensure that the metrics used by the IGPs are compatible, or, if needed, converts the metrics used by the IGPs to be compatible.

Figure 7:
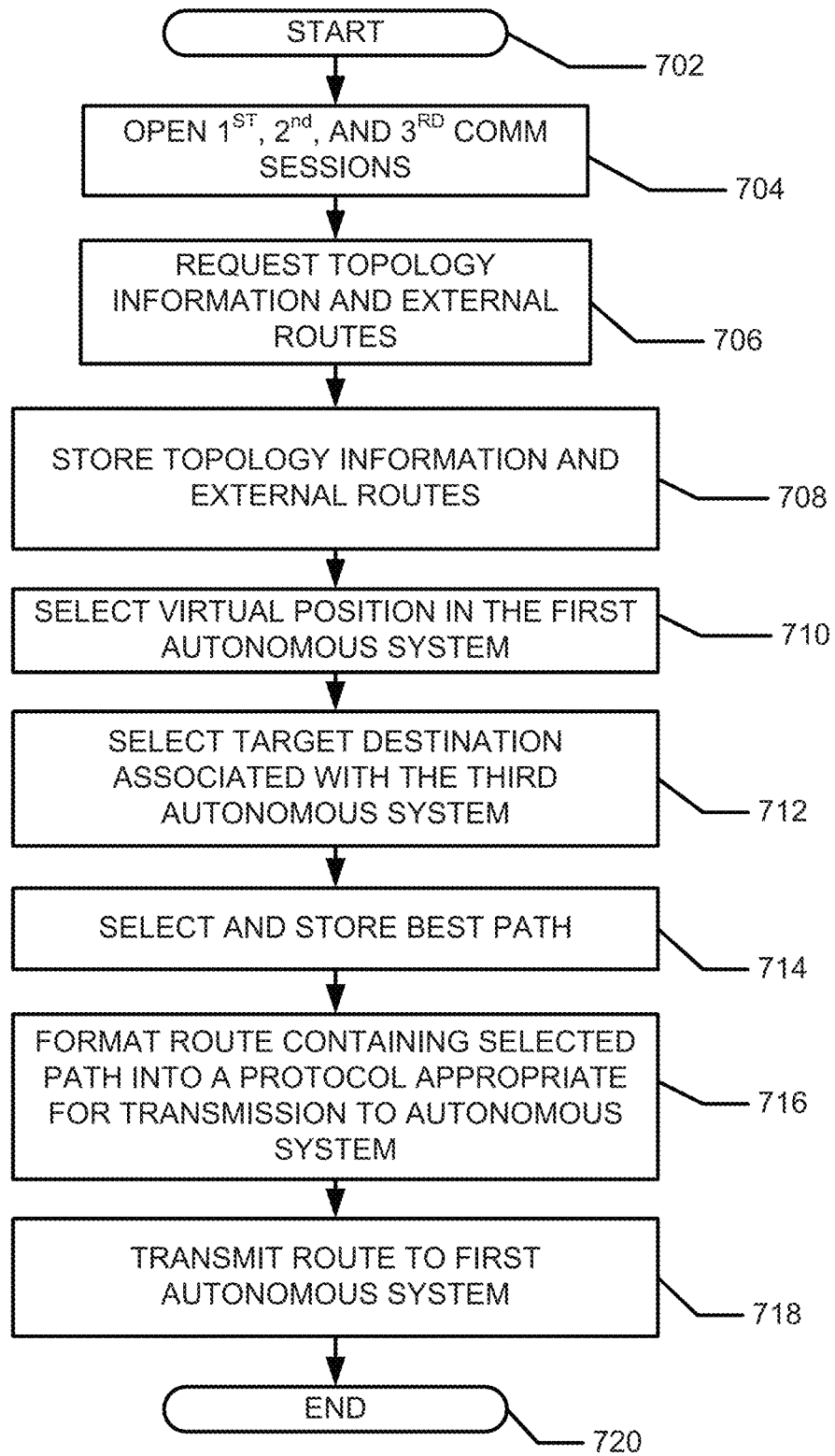
FIG. 7 is a flowchart representative of fourth example computer readable instructions that can be executed by the example virtual route reflector illustrated in FIG. 1, FIG. 2 and/or FIG. 3.

Referring now to FIG. 7, a program 700 represents a method by which the example virtual route reflector 110 performs route reflection for an autonomous system (e.g., the AS1 104) from a location outside of the AS1 104 by virtually positioning itself at a location within the AS1 104. As described below, in the method represented by the program 700, the virtual route reflector 110 uses a first topology describing the topology of the AS1 104, a second topology information describing the topology of the AS2 106, and a third topology information describing the topology of the AS3 108 to determine a best path between an internal node (e.g., the IN1 134A) of the AS1 104 and a provider edge router associated with the AS3 108. Referring also to FIG. 1 and FIG. 2, the method 700 begins at a block 702 after which the example network interface 202 (see FIG. 2) of the example virtual route reflector 110 (see FIG. 1 and FIG. 2) initiates a first BGP communication session with the example autonomous system boundary router ASBR1 114, and further initiates second and third BGP communication sessions with the example autonomous system boundary router ASBR3 122 (see FIG. 1) of the AS2 106 and the example autonomous system boundary router ASBR5 126 (see FIG. 1) of the AS3 108 (block 604). During the first BGP communication session, the example topology and route collector 204 (see FIG. 2) requests first topology information for the AS1 104 from the ASBR3 122 and, during the second BGP communication session, the topology and route collector 204 requests second topology information for the AS2 106 from the ASBR 3 122. During the third BGP communication session, the topology and route collector 204 requests third topology information for the AS3 108 from the ASBR5 126 (block 606). In some examples, the virtual route reflector 110 is unable to directly communicate with the ASBR5 126. In some such examples, the virtual route reflector 110 instructs the ASBR3 122 to request the third topology information from the ASBR5 126.

Responsive to the request, the ASBR1 114, the ASBR3 122 and the ASBR5 126 respond by supplying the with the first, second and third topology information, respectively, in a format that is transferrable using an EBGP such as, for example BGP-LS.

In some examples, the topology and route collector 204 uses the first, second, and third topology information, respectively, to identify the nodes 134 residing in the AS1 104 and the links by which the nodes 134 are coupled, the nodes 136 residing in the AS2 106 and the links by which the nodes 136 are coupled and the nodes 138 residing the AS3 108 and the links by which the nodes are coupled, respectively. The topology and route collector 204 also uses the first, second, and third topology information to identify a cost (or metric) associated with each link in the AS1 104, the AS2 106 and AS3 108.

During the first, second and third communication sessions, respectively, the example topology and route collector 204 also 1) requests that the ASBR1 114 transmit external network routing information identifying external routes that are advertised by the border routers associated with the first autonomous system AS1 104, 2) requests that the ASBR1 114 transmit external network routing information identifying external routes that are advertised by the border routers associated with the second autonomous system AS2 106, and 3) requests that the ASBR5 126 transmit external network routing information identifying external routes that are advertised by the border routers associated with the third autonomous system AS3 108 (also block 706).

The example topology and route collector 204 stores the first, second and the third topology information as a topology database in the example topology database storage 206 (block 708) and stores the external routes in the example external route database (also block 708).

In some examples, the example virtual positioner 210 of the example virtual route reflector 110 uses the first topology information to select an internal node (in this example IN1 134A) residing within the example first autonomous system AS1 104 (block 810). The location of the selected node IN1 134A within the AS1 104 will be used as the virtual position of the virtual route reflector 110 to select paths as described in greater detail below.

Additionally, the example path selector 212 uses the third topology information stored in the topology database storage 206 (see FIG. 2) to identify and selects a target network destination that is external to the first autonomous system AS1 104 (block 812). In this example, the provider edge router PE2 132 is selected as the target network destination. Next, the path selector 212 uses any desired method including, for example, Dijkstra's algorithm to select a "best" path from the virtual position (e.g., from the IN1 134A) to the PE2 132 coupled to the AS3 108. In some such examples, the best path is selected as the path extending from the virtual position (IN1 134A) to the PE2 132 that has a lowest overall cost as compared to other possible paths between the virtual position (IN1 134A) and the PE2 132. In some such examples, the costs associated with any links that, together, form a path are combined to formulate an accumulated IGP cost (also known as an AIGP cost). Example techniques that can be used to obtain an AIGP cost for a path having links from more than a single autonomous system are described in a Request for Comment no. 7311 entitled, "The Accumulated IGP Metric Attribute for BGP" published by the Internet Engineering Task Force (IETF). In some examples, the path selector calculates an AIGP cost for each possible path between the virtual position and the IN12 138D and then selects the path having the lowest cost. For illustrative purposes, the "path2" representing by the dotted line (extending from IN1 134A to ASBR1 114 and then to ASBR4 124 and then to ASBR6 128 and then to PE2 132 in FIG. 1) is determined to be the shortest path and, as such, is selected by the path selector 212. In some such examples, the overall cost of the path2 (e.g., the AIGP for path2) is determined by adding: 1) a first cost associated with the portion of the path2 extending from the PE2 132 to the ASBR6 128, 2) a second cost associated with the portion of the path2 extending from the ASBR6 128 to the ASBR4 124, and a 3) a third cost associated with the portion of the path2 extending from the ASBR1 114 to the IN1 134A residing in the first autonomous system AS1 104. There is no cost metric associated with the portion of the path2 that extends from the ASBR4 124 to the ASBR1 114 because that portion of the path2 is not associated with an IGP.

After identifying the path2 as the shortest path, the path selector 212 stores information identifying the path2 and further identifying the AIGP cost associated with the path2 in the example path storage 214 (block 814). In some examples, the information identifying the shortest path (i.e., the selected path) includes the address of the autonomous system boundary router that is on the path2 and that is nearest to the source node of the path2 (in this example IN1 134A) (block 816). Additionally, information identifying the address of the source of the selected path (in this example, the IN1 134A) and the destination of the selected path (in this example, the PE2 132) is also included in the stored path information.

If needed, the example route advertiser 216 then converts the information identifying the selected path into a route using a routing protocol or format (e.g., BGP-LS with the AIGP attribute enabled) that is suitable for transmission to the ASBR3 122 and to the ASBR5 126 (block 818). The example route advertiser 216 then provides the route information containing the selected path to the example network interface 202 for transmission to the ASBR1 114 (block 620) and the method ends (block 622).

Upon receipt of the advertised route, the ASBR 114 supplies the route to the internal node IN1 134A of the AS1 104 for use in reaching the PE2 132 associated with the example third autonomous system AS3 108.

In some examples, the method represented by the program 700 is repeated until a "best" path between each internal node residing in the AS1 104 and each internal node residing in the AS3 108 (as well as each of the boundary routers associated with the third autonomous system AS3 108) have been selected and information identifying the best paths has been transmitted to the corresponding autonomous systems. Thus, the method represented by the program 700 can be used to improve routing efficiency between three autonomous systems that use the same IGP or different IGPs provided that when the IGPs used by the three autonomous system are different, the administrator takes measures to ensure that the metrics used by the IGPs are compatible, or, if needed, converts the metrics used by the IGPs to be compatible.

Figure 8:
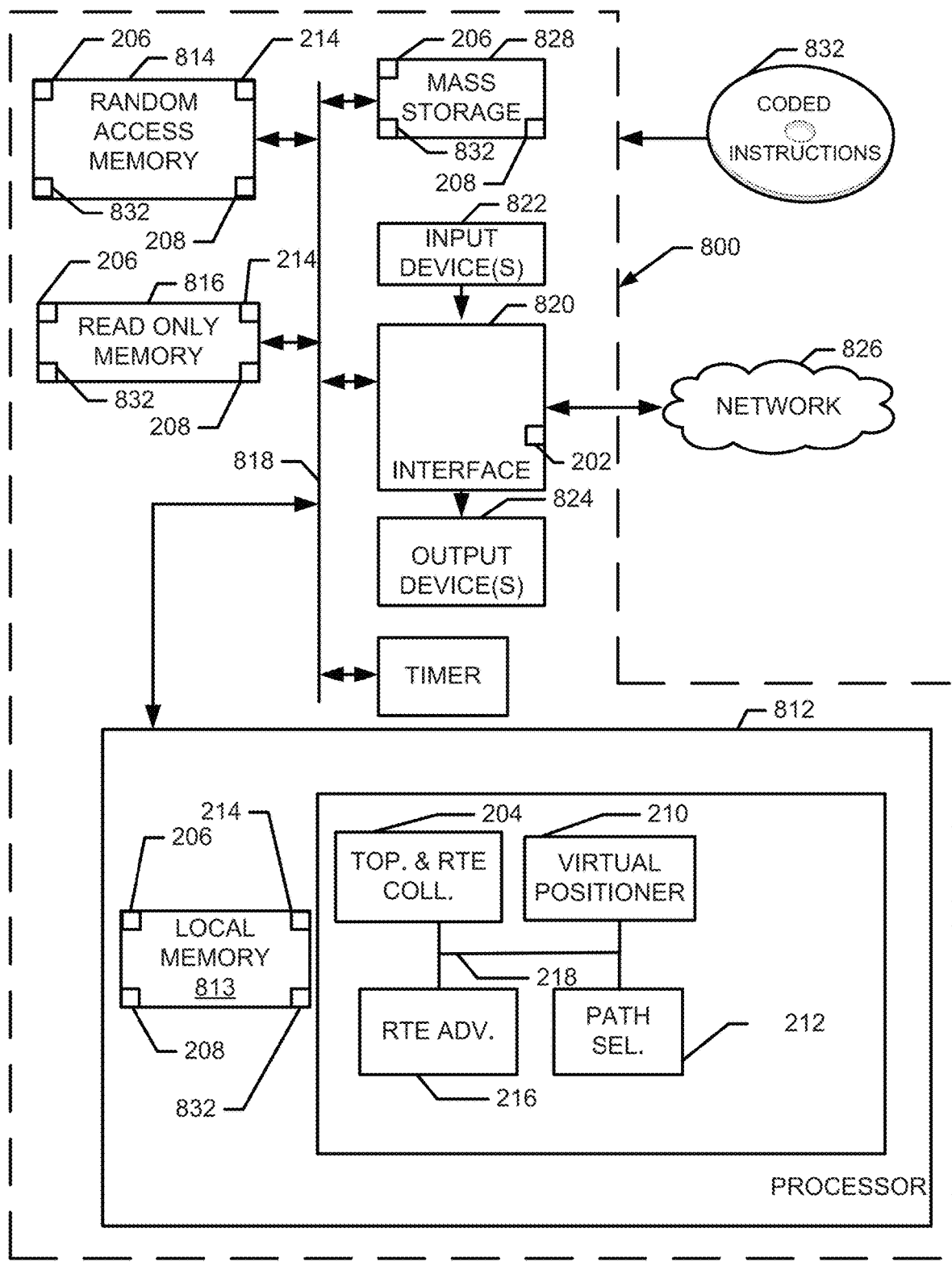
FIG. 8 is a block diagram of an example processor platform structured to execute the example machine readable instructions of FIGS. 4, 5 6 and/or 7 to implement the example virtual route reflector of FIGS. 1, 2 and/or 3.

FIG. 8 is a block diagram of an example processor platform 1000 capable of executing the instructions of FIGS. 4, 5, 6, and 7 to implement the virtual route reflector 110 of FIG. 2. The processor platform 800 can be, for example, a server, a personal computer, a mobile device or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 1032, which include the example instructions of FIGS. 4, 5, 6 and/or 7, to implement the example topology and route collector 204, the example virtual positioner 210, the example path selector 212, and the example route advertiser 216 of FIG. 2.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface. In the illustrated example of FIG. 8, the interface circuit 820 is also structured to implement the example network interface 202.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4, 5, 6, and 7 may be stored in the mass storage device 828, in the volatile memory 814, in the non-volatile memory 816, and/or on a removable tangible computer readable storage medium such as a CD or DVD. In some examples, the mass storage device 830 may implement the example topology database storage 206 and/or the example external routes database storage 208 and/or the example path storage 214. Additionally or alternatively, in some examples the volatile memory 818 may implement the example topology database storage 206 and/or the example external routes database storage 208 and/or the example path storage 214.

From the foregoing, it will be appreciated that the above disclosed methods, apparatus and articles of manufacture permit the virtualization of route reflectors thereby saving on cost and complexity. Further, the virtual route reflectors disclosed herein can be located anywhere even, geographically distant from the autonomous system it serves and yet still effectively perform hot potato routing. Additionally, the virtual route reflectors disclosed herein are capable of performing more efficient routing of messages between two and even three autonomous systems that operate using different interior gateway protocols.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   requesting, by a virtual route reflector of server equipment comprising a processor, from an autonomous system, topology information for the autonomous system, and route information identifying border routers at a border of the autonomous system through which a remote destination external to the autonomous system is able to be reached via an external network external to the autonomous system, wherein the autonomous system comprises nodes connected via a network within the autonomous system, and wherein the server equipment is external to the autonomous system;
   selecting, by the virtual route reflector using the topology information, a shortest path from among paths emanating from a selected node of the nodes of the autonomous system and exiting the autonomous system at respective ones of the border routers; and
   advertising, by the virtual route reflector to a client router in the autonomous system, a route to the remote destination, the route comprising a border router of the border routers at which the shortest path exits the autonomous system.

2. The method of claim 1, wherein the shortest path is determined to be a nearest point of egress from the autonomous system relative to the selected node.

3. The method of claim 1, wherein the topology information is first topology information, wherein the autonomous system is a first autonomous system, and further comprising requesting second topology information from a second autonomous system, wherein the shortest path is selected based on the first topology information and the second topology information, and wherein the remote destination is located in the second autonomous system.

4. The method of claim 3, wherein the first topology information is associated with a first interior gateway protocol, the second topology information is associated with a second interior gateway protocol, and the first and second interior gateway protocols are different protocols.

5. The method of claim 1, wherein the topology information is associated with an interior gateway protocol, wherein the border router is a first border router of the border routers, and wherein the requesting of the topology information comprises initiating a border gateway protocol session with a second border router of the border routers.

6. The method of claim 1, wherein the selecting of the shortest path comprises selecting the shortest path to have a lowest cost relative to other ones of the paths.

7. The method of claim 1, wherein the shortest path is a first shortest path, wherein the paths are first paths, wherein the client router is a first client router, wherein the selected node is a first selected node, and further comprising:
   selecting, using the topology information, a second shortest path from among second paths emanating from a second selected node of the autonomous system and exiting the autonomous system at respective ones of the border routers; and
   advertising, from outside the autonomous system to a second client router in the autonomous system, a second route to the remote destination, the second route comprising a second border router at which the second shortest path exits the autonomous system.

8. A non-transitory computer readable medium comprising computer readable instructions that, when executed, cause a processor at a route reflector to at least:
   request, from an autonomous system, topology information for the autonomous system, and route information identifying a group of border routers at a border of the autonomous system through which a remote destination external to the autonomous system can be reached via external network equipment associated with an external network outside of the autonomous system, wherein the autonomous system comprises a group of nodes connected via internal network equipment associated with an internal network within the autonomous system, and the route reflector is located outside the autonomous system;
   select, using the topology information, a shortest path from among a group of paths emanating from a selected node of the group of nodes of the autonomous system and exiting the autonomous system at respective ones of the group of border routers; and
   advertise, from the route reflector to a client router in the autonomous system, a route to the remote destination, the route comprising a first border router of the group of border routers at which the shortest path exits the autonomous system.

9. The non-transitory computer readable medium of claim 8, wherein the computer readable instructions, when executed, cause the processor to determine the shortest path to be a nearest point of egress from the autonomous system relative to the selected node.

10. The non-transitory computer readable medium of claim 8, wherein the topology information is first topology information, wherein the autonomous system is a first autonomous system, wherein the computer readable instructions, when executed, further cause the processor to request second topology information from a second autonomous system, wherein the shortest path is selected based on the first topology information and the second topology information, and wherein the remote destination is located in the second autonomous system.

11. The non-transitory computer readable medium of claim 10, wherein the first autonomous system is contiguous with the second autonomous system.

12. The non-transitory computer readable medium of claim 8, wherein the topology information is associated with an interior gateway protocol, and wherein the requesting of the topology information comprises initiating a border gateway protocol session with a second border router of the group of border routers.

13. The non-transitory computer readable medium of claim 8, wherein the topology information is associated with an interior gateway protocol, and wherein the computer readable instructions, when executed, further cause the processor to request of the topology information by initiating a border gateway protocol session with a second border router of the group of border routers.

14. The non-transitory computer readable medium of claim 8, wherein the selecting of the shortest path comprises selecting the shortest path to have a lowest cost relative to other ones of the group of paths.

15. An apparatus, the apparatus comprising:
a processor; and
memory comprising machine readable instructions that, when executed, cause the processor to at least:
request, from an autonomous system, topology information for the autonomous system, and route information identifying border routers at a border of the autonomous system through which a remote destination external to the autonomous system is reachable via external network equipment external to the autonomous system, wherein the autonomous system comprises nodes connected via internal network equipment internal to the autonomous system, and wherein the apparatus is external to the autonomous system;
select, using the topology information, a shortest path from among paths emanating from a selected node of the nodes of the autonomous system and exiting the autonomous system at respective ones of the border routers; and
advertise to a client router in the autonomous system, a route to the remote destination, the route comprising one of the border routers at which the shortest path exits the autonomous system.

16. The apparatus of claim 15, wherein the shortest path is determined to be a nearest point of egress from the autonomous system relative to the selected node.

17. The apparatus of claim 15, wherein the topology information is first topology information, wherein the autonomous system is a first autonomous system, wherein the machine readable instructions, when executed, further cause the processor to request second topology information from a second autonomous system, wherein the shortest path is selected based on the first topology information and the second topology information, and wherein the remote destination is located in the second autonomous system.

18. The apparatus of claim 17, wherein the first topology information is associated with a first interior gateway protocol, the second topology information is associated with a second interior gateway protocol, and the first and second interior gateway protocols are different protocols.

19. The apparatus of claim 17, wherein the first autonomous system is contiguous with the second autonomous system.

20. The apparatus of claim 15, wherein the apparatus is deployed in a data center.

* * * * *